N. HUTCHINSON & A. HUBBELL.
Hulling-Machine.
No. 212,005. Patented Feb. 4, 1879.
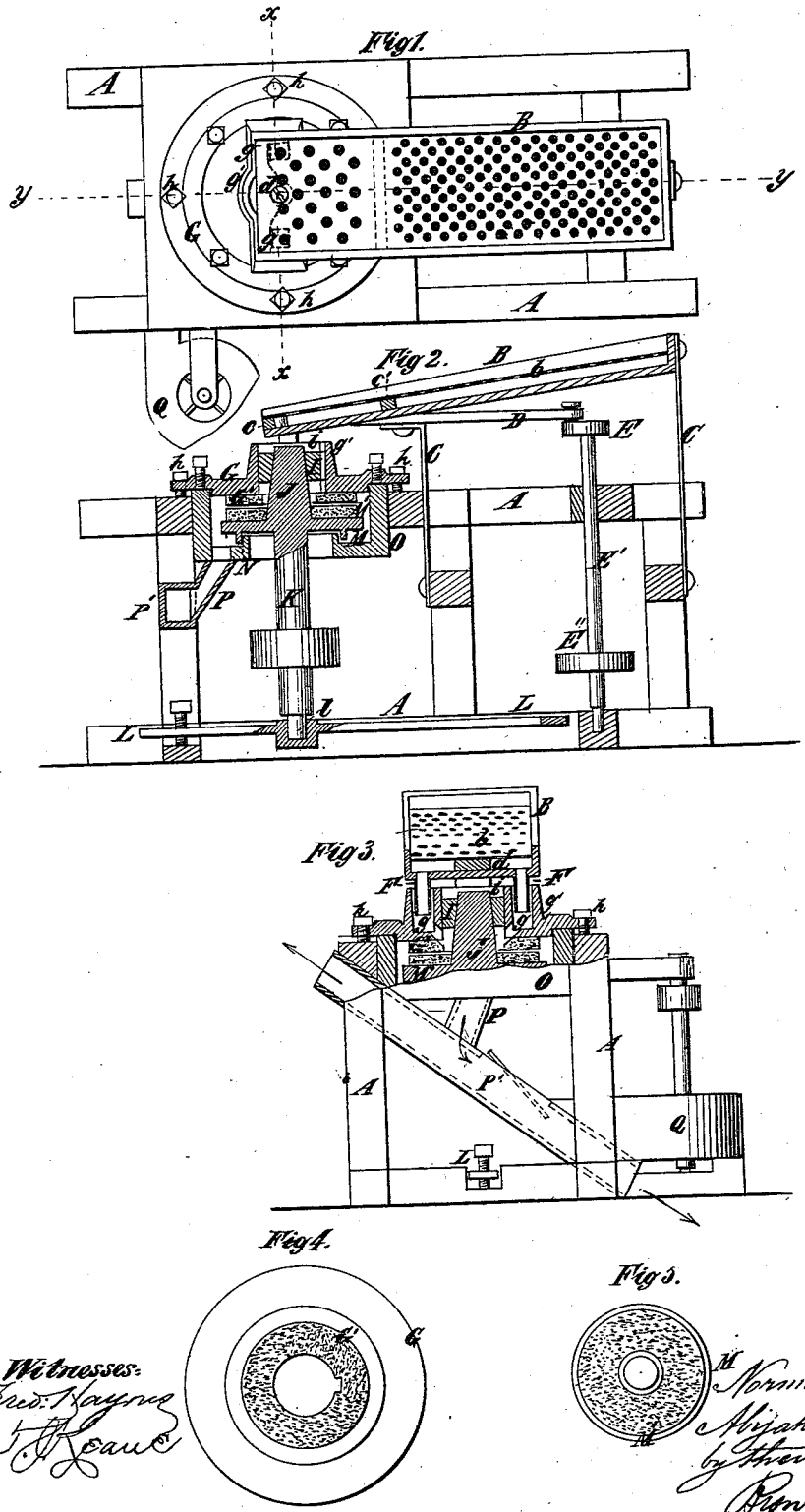

UNITED STATES PATENT OFFICE.

NORMAN HUTCHINSON, OF NORTHEAST, AND ABIJAH HUBBELL, OF AMENIA, NEW YORK.

IMPROVEMENT IN HULLING-MACHINES.

Specification forming part of Letters Patent No. 212,005, dated February 4, 1879; application filed October 12, 1878.

*To all whom it may concern:*

Be it known that we, NORMAN HUTCHINSON, of Northeast, in the county of Dutchess and the State of New York, and ABIJAH HUBBELL, of Amenia, in the county of Dutchess and State of New York, have invented an Improvement in Hulling-Machines for Buckwheat, Rice, and other Grain; and we do hereby declare that the following is a full, clear, and exact description of the same, reference being had to the accompanying drawings, forming a part of this specification.

This invention relates to that class of hulling-machines in which a stationary horizontal scouring or grinding stone or plate and a runner on a rotary vertical shaft are employed.

It consists in a novel construction and arrangement of a bearing for the shaft of the runner, whereby whatever wear occurs in said bearing is self-compensating, and the runner is maintained in true concentric relation with the stationary stone or plate without manual adjustment.

The machine, as shown and described, is of the bottom-runner type, and its construction is illustrated in the accompanying drawings, of which—

Figure 1 is a top view. Fig. 2 is a vertical central section. Fig. 3 is a partially-sectional end view; and Figs. 4 and 5, face views of the top and bottom hulling-plates.

A represents the housing or frame of the machine, which supports all the working parts. B is the hopper, which feeds the grain to the hulling plates or stones. The hopper is supported preferably upon vertical springs, and is shaken by a pitman, D, driven from a crank, E, on a shaft, E', having attached thereto a pulley, E''.

The hopper B is of trough-like form, and has a perforated false bottom, $b$. Below said false bottom are attached to the bottom of the hopper two transverse bars, $c$ $c'$, the former being at the lower part or end of the hopper, and the latter at a short distance (more or less) above the former. The perforations of the false bottom above the bar $c'$ are smaller than those below said bar, the latter perforations being of a size to permit the passage of the grain to be hulled, and those above said bar being of a size to permit only the passage of impurities which are collected in the space above said bar. At the lower part of the hopper, and below the false bottom $b$, is a double inclined plane, $d$, which directs the grain (after the same has passed through the perforated false bottom $b$) sidewise into the lower corners of the space below said false bottom. Leading from said corners downward are chutes F, through which the grain passes to the hullers, as hereinafter set forth.

Said chutes are attached to said hopper and oscillate with the same. The grain passes from the chutes F down into openings or passages $g$ in the top plate or bed-stone G, which is attached to the upper part of the frame or housing by screws $h$. The distance of the hulling-plate G from the runner is regulated by screws $h'$. To the under side of the plate G is centrically attached, by cementing, an annular plate or wheel, G', of emery composition, and of a kind suitable to act by attrition in hulling grain. As there are a number of emery compositions now well known in the art suitable for this purpose, it is unnecessary to specify any particular kind. We do not limit ourselves to any particular cement for attaching the emery plate to the metal plate G, as there are several kinds of cement that will answer the purpose and are more or less efficient. We have found, however, that a cement composed of gum-shellac, alcohol, and dry white lead is well adapted for the purpose.

In the center of the plate is a boss, $g'$, having a centrical cylindrical bore, into which is fitted a bearing, I, for the journal J of the shaft K. The bearing I is cylindrical in form, and is splined in the cylindrical bore of the boss $g'$. In the central portion of the bearing I is a conical hole, $i$, which receives the journal J, said journal being also conical in form and fitted to said hole. It is evident that, whenever the inner surface of the hole $i$ or the exterior of the journal J wears, the bearing I will descend a little by its own gravity and take up said wear automatically, and that thus the journal J will always be held practically in true central relation with the plate G and the attached emery plate or wheel G'. The shaft K is stepped in a supporting-bar, L, which is adjustable, and has a bearing for the lower journal of said shaft at *l*.

Attached to, but preferably formed in one piece with, the shaft K is a plate, M. To the upper side of the plate M is attached an annular plate or wheel, M', of emery composition, in the same manner as described for the emery plate or wheel G'. By attrition between the emery plates the grain is hulled. From the under side of the plate M projects downwardly a rim, which surrounds another rim on the inner side of an annular box, O, that incloses the hulling-plates. From an opening in the bottom of the box O leads obliquely downward a chute, P P', through which the hulled grain passes out of the machine, being cleaned from the hulls and dust on its way from the hulling-plates by a blast of wind passed upward through said chute from a fan-wheel, Q. The shaft K receives motion from a pulley, R.

By the improvements described the objects above set forth are accomplished, and a cheaper, more easily adjusted, and more efficient machine is obtained.

We claim—

The combination, in a hulling-machine, of the conical upper bearing of the runner-shaft K, the bearing I, fitted to said journal, and a vertical box or boss, *g*, in which said bearing slides by its own gravity to take up wear without turning on its central axis, substantially as and for the purpose described.

NORMAN HUTCHINSON.
ABIJAH HUBBELL.

Witnesses:
LEWIS HUTCHINSON,
FRANK ROOT.